(12) United States Patent
Westermann et al.

(10) Patent No.: US 6,286,176 B1
(45) Date of Patent: Sep. 11, 2001

(54) WINDSHIELD WIPER CONNECTOR

(75) Inventors: Klaus-Juergen Westermann, Karlsbad (DE); Eric Pollaris, Meeuwen-Gruitrook (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,817

(22) PCT Filed: Oct. 8, 1998

(86) PCT No.: PCT/DE98/02969

§ 371 Date: Aug. 9, 1999

§ 102(e) Date: Aug. 9, 1999

(87) PCT Pub. No.: WO99/20502

PCT Pub. Date: Apr. 29, 1999

(30) Foreign Application Priority Data

Oct. 17, 1997 (DE) .......................................... 297 18 457 U

(51) Int. Cl.⁷ ....................................................... B60S 1/40
(52) U.S. Cl. ....................................................... 15/250.32
(58) Field of Search .......................... 15/250.32, 250.31, 15/250.44

(56) References Cited

U.S. PATENT DOCUMENTS

| | | | | |
|---|---|---|---|---|
| 3,757,377 | * | 9/1973 | Hayburst | 15/250.32 |
| 3,919,735 | * | 11/1975 | Arman | 15/250.32 |
| 4,142,268 | * | 3/1979 | Brown et al. | 15/250.32 |
| 5,606,765 | * | 3/1997 | Ding | 15/250.32 |

FOREIGN PATENT DOCUMENTS

| | | | | |
|---|---|---|---|---|
| 2078254 | * | 11/1971 | (FR) . | |
| 2358296 | * | 2/1978 | (FR) . | |
| 2418608 | * | 9/1979 | (FR) . | |
| 2501135 | * | 9/1982 | (FR) | 15/250.32 |
| 2533517 | * | 3/1984 | (FR) . | |

* cited by examiner

Primary Examiner—Gary K. Graham
(74) Attorney, Agent, or Firm—Michael J. Striker

(57) ABSTRACT

The invention relates to a windshield wiper, having a drivably supported wiper arm which on its free end carries a wiper blade, and the wiper blade is joined detachably and pivotably to the wiper arm by means of a retaining bracket, and for the sake of adapting different wiper arms and retaining brackets, the connection is made via an adapter element. The point of departure for the proposal is that the adapter element (28) can be disposed pivotably about 180°, and for the detachable and pivotable connection between the wiper arm (12) and the retaining bracket (22) a detent connection exists both between the adapter element (28) and the wiper arm (12) and between the adapter element (28) and the retaining bracket (22).

7 Claims, 3 Drawing Sheets

WINDSHIELD WIPER CONNECTOR

BACKGROUND OF THE INVENTION

Figure 1:
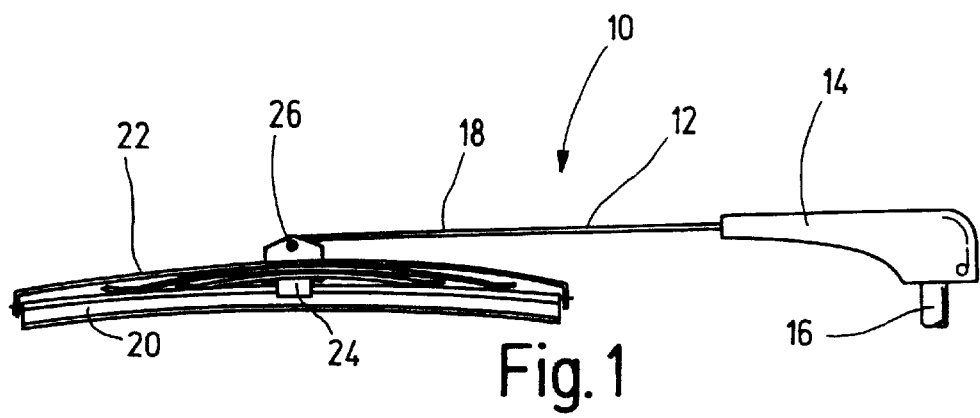

The invention relates to a windshield wiper.

Windshield wipers of a generic type are known. They are typically used for wiping motor vehicle windows, to assure a clear view for a vehicle driver. To that end, the windshield wipers have a wiper arm, which can be set into a pivoting or swinging motion by a wiper drive mechanism. The wiper arm is connected by one end to a wiper shaft that is solidly fixed to the vehicle body, while the other, free end of the wiper arm carries a wiper blade. To connect the wiper blade to the wiper arm, a retaining bracket is provided, which is detachably and pivotably connected to the free end of the wiper arm. The detachable arrangement makes it possible to replace worn wiper blades, while the pivotable arrangement allows the wiping motion to be adapted to curved windows. It is known to connect the wiper arm to the retaining bracket via an adapter element, which makes it possible to adapt the wiper arm to the retaining bracket. It is disadvantageous that this adapter element is tailor-made for a particular wiper arm or retaining bracket, so that a corresponding number of different adapter elements have to be on hand that are typically shipped along with the wiper blades, and the adapter element that fits must then be selected from them.

SUMMARY OF THE INVENTION

It is therefore an object of the present invention to provide a windshield wiper which avoids the disadvantages of the prior art.

In keeping with these objects, one feature of present invention, resides, briefly stated, in a windshield wiper which has a drivably supported wiper arm; a wiper blade carried on a free end of said wiper arm; a retaining bracket detachably and pivotably connecting said wiper blade with said wiper arm; an adapter element connecting said wiper arm and said retaining bracket, said adapter element having a shape which permits a form-and force-locking connection with said wiper arm and said retaining bracket, said adapter element is detachably arrangeable on said wiper arm and said retaining bracket in individual positions in which said adapter element is pivoted by 180° with respect to said wiper arm and having a different shape characteristic permitting adaptation to differently shaped wiper arms.

The windshield wiper of the invention offers the advantage over the prior art that it is possible to adapt the detachable and pivotable connection between the wiper arm and the retaining bracket by means of a single adapter element. Because the adapter element, by means of mounting rotated about 180°, allows different wiper arms to be connected detachably and pivotably to the retaining bracket, and a detent connection exists between each adapter element and the wiper arm and the retaining bracket, it is possible in a simple way, by mounting the adapter element in a suitably rotated position, to permit simple, fast mounting of wiper blades on different wiper arms.

In a preferred feature of the invention, it is provided that the adapter element has shape characteristics that make a form lock with a wiper arm to be mounted an absolute prerequisite, so that incorrect mounting, for instance with an adapter element oriented wrong, is impossible.

Further advantageous features of the invention will become apparent from the other characteristics recited in the dependent claims.

DRAWING

Figure 2:
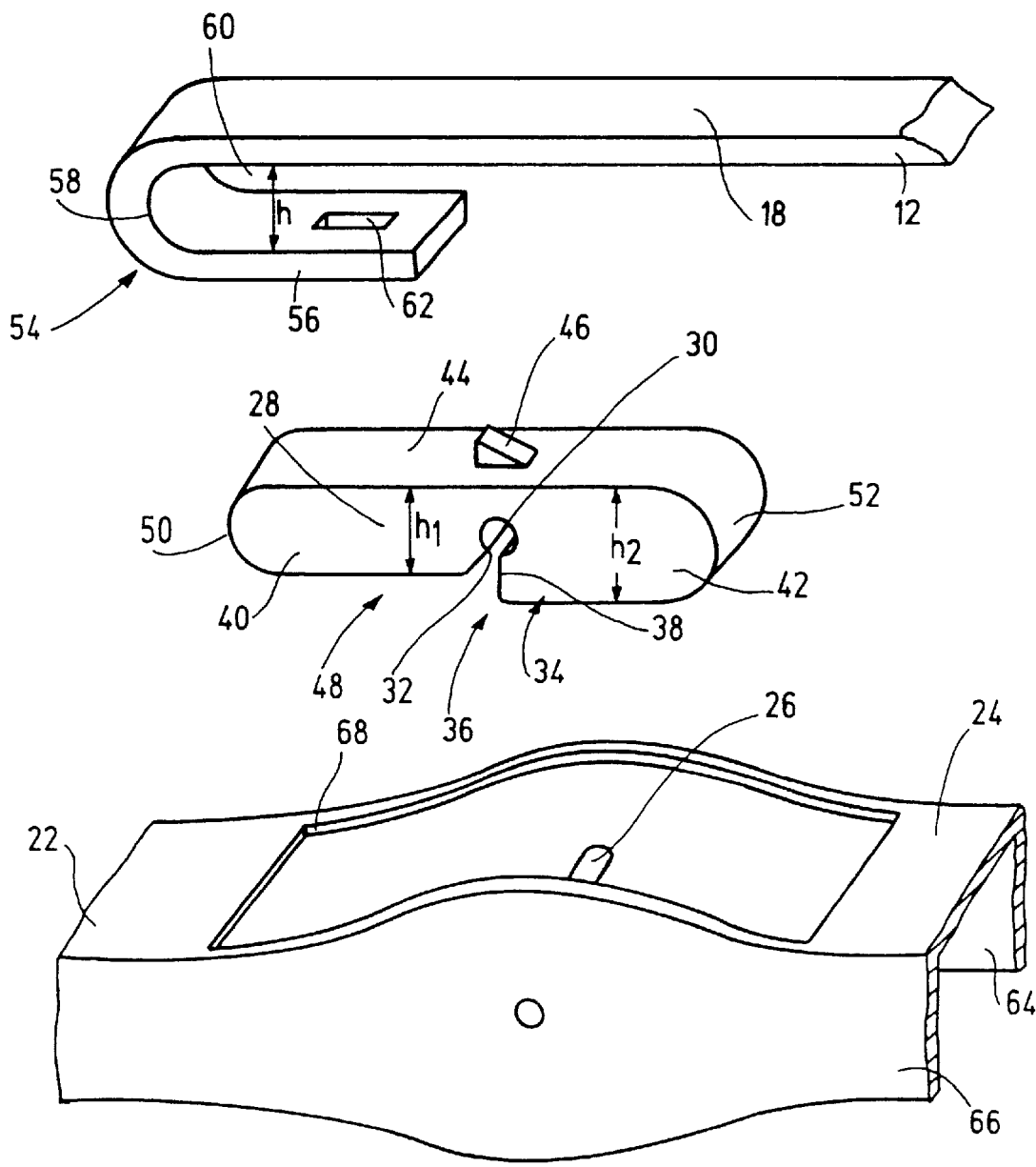
Figure 5:
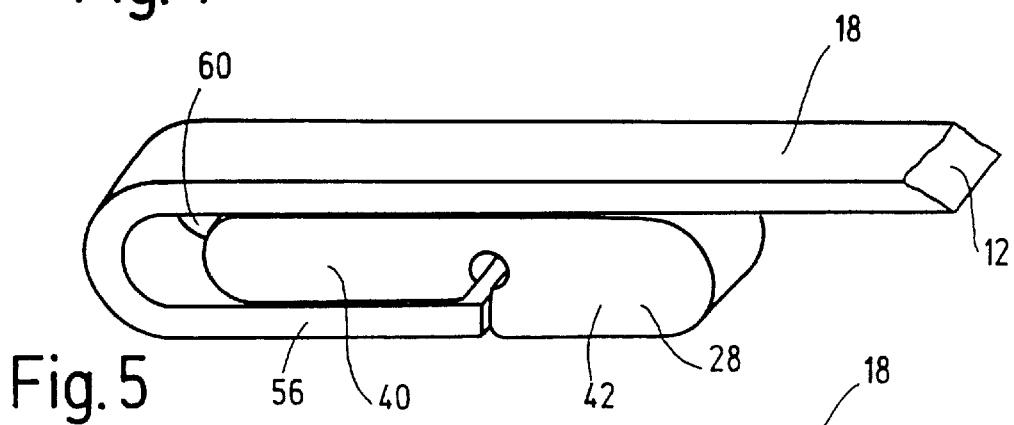
Figure 6:
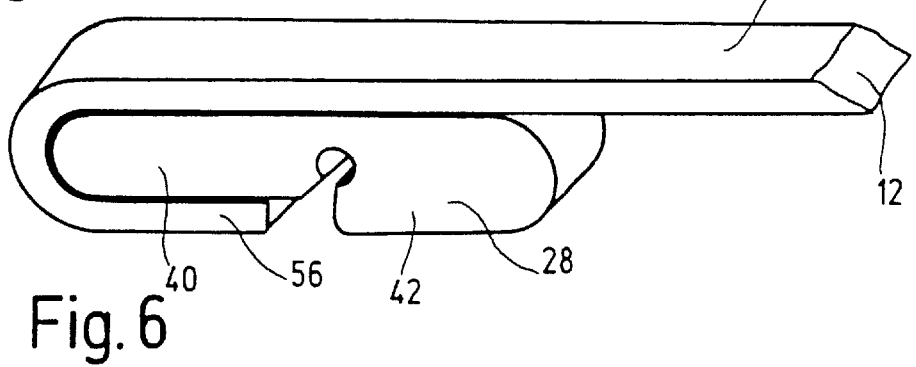
Figure 7:
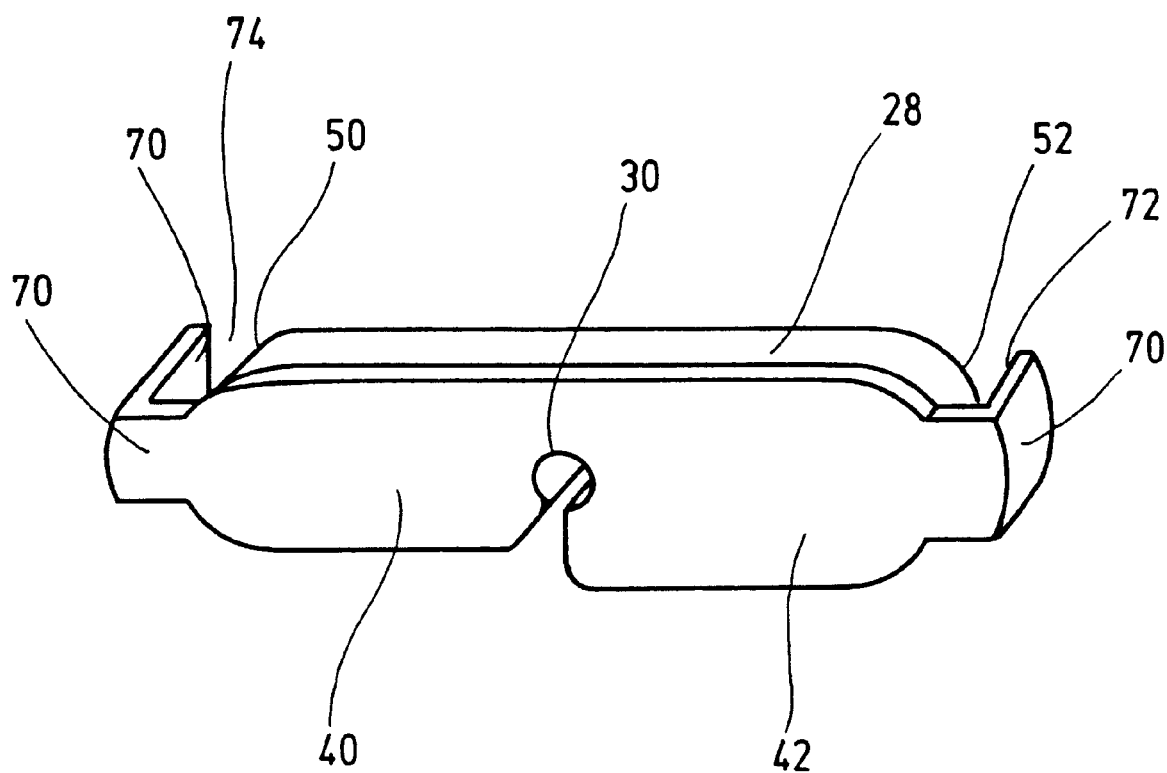

The invention will be described in further detail below in terms of exemplary embodiments, in conjunction with the associated drawings. Shown are:

FIG. 1, a schematic view of the entire windshield wiper;

FIG. 2, an exploded view of a connection point between a wiper arm and a retaining bracket;

FIGS. 3–6, perspective views of an adapter element mounted on different wiper arms; and FIG. 7, a perspective view of an adapter element in a further exemplary embodiment.

DESCRIPTION OF THE PREFERRED EMBODIMENTS

FIG. 1 shows a windshield wiper 10. The windshield wiper 10 has a wiper arm 12, one end 14 of which is disposed on a wiper shaft 16 in a manner secured against relative rotation. The other, free end 18 of the wiper arm 12 carries a wiper blade 20. The wiper blade 20 is retained by a retaining bracket 22, which via a fastening part 24 is connectable detachably and pivotably to the end 18 of the wiper arm 12. The pivotable connection is made via a pivot pin 26, which extends approximately at right angles to the wiper shaft 16.

FIG. 2 shows an exploded view of the connection region between the fastening part 24 of the retaining bracket 22 and the end 18 of the wiper arm 12. The fastening is effected via an adapter element 28. The adapter element 28 has a through opening 30 that is open at the periphery and extends axially in the direction of the pivot pin 26. The through opening 30 is disposed approximately centrally in the adapter element 28. For forming a slot 32, a longitudinal face 34 has a shoulder 36, whose face 38 extending radially to the through opening 30 opens out into a jacket face of the through opening 30. Because of the embodiment of the shoulder 36, the adapter element 28 has a first portion 40 with a height $h_1$ and a second portion 42 with a height $h_2$. On the longitudinal face 44 opposite the longitudinal face 34, a detent tongue 46 is formed. A further detent tongue 48 (FIG. 4; not visible in FIG. 2) is embodied on the longitudinal face 34 in the region of the portion 40 of the adapter element 28. The end faces 50 and 52 joining together the respective longitudinal faces 34 and 44 each merge via a radius with the longitudinal faces 34 and 44; the radius of the end face 50 is determined by the height $h_1$, and the radius of the end face 52 is determined by the height $h_2$.

The end 18 of the wiper arm 12 forms a hook 54, and a portion 56 extending parallel to the end 18 has a spacing h. The portion 56 merges via an inner jacket face 58 with the end 18; the jacket face 58 extends at a radius defined by the height h. A peripheral opening 62, pointing in the direction of a free space 60 formed between the end 18 and the portion 56, is embodied on the portion 56.

The retaining bracket 22 has a U-shaped profile—when viewed in cross section—between whose legs 64 and 66 the pivot pin 26 extends. In the region of the pivot pin 26, there is a recess 68 whose length is greater than a length of the adapter element 28.

For mounting the wiper arm 12 together with the retaining bracket 22, the adapter element 28 is first snapped in detent fashion onto the pivot pin 26. To that end, a width of the slot 32 toward the through opening 30 is embodied such that a locking connection results. A diameter of the through opening 30 is substantially equivalent to a diameter of the pivot pin 26, so that the adapter element 28 is rotatably supported on the pivot pin 26. As a result, on the one hand the pivotable connection between the wiper arm 12 and the retaining bracket 22 is made possible, and on the other—as will be described in further detail in conjunction with the subsequent drawings—it is possible to position the adapter element 28 in different ways. The end 18 of the wiper arm 12 is slipped onto the mounted adapter element 28; depending on the given height h, either the portion 40 or the portion 42 of the adapter element 28 is introduced into the free space 60 of the end 18 of the wiper arm 12. Thrusting the adapter element 28 into the free space 60 causes either the detent tongue 46 or the detent tongue 48, depending on the position of the adapter element 28, to reach the region of the detent opening 62, so that a form- and force-locking connection is brought about between the adapter element 28 and the wiper arm 12.

Various possibilities for the detent connection between the adapter element 28 and the wiper arm 12 are shown in FIGS. 3–6. Elements identical to those of FIG. 2 are provided with the same reference numerals and will not be described again. For the sake of simplicity, the retaining bracket 22 has not been shown.

Figure 3:
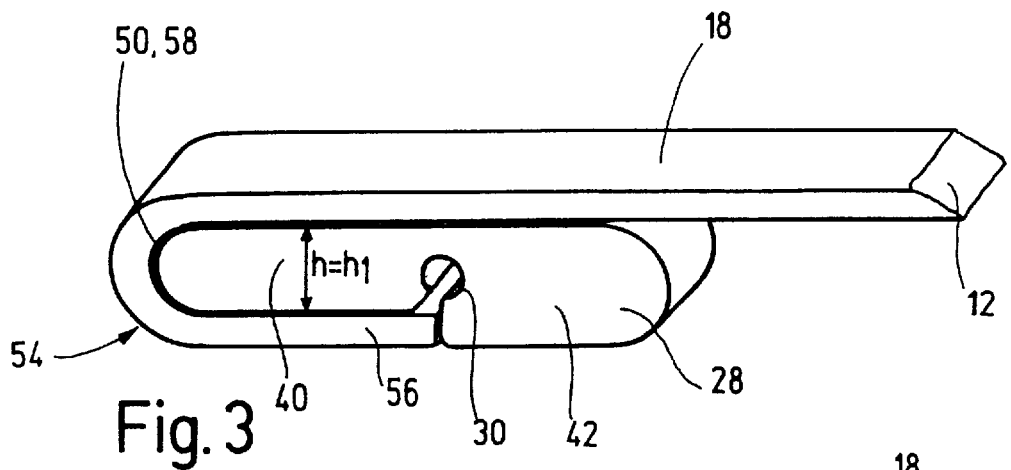

In the view shown in FIG. 3, it is assumed that the height h at the wiper arm 12 is equivalent to the height $h_1$ of the portion 40 of the adapter element 28. The adapter element 28 is thrust with its portion 40 into the free space 60, until a form lock exists between the end face 50 and the jacket face 58. At the same time, the detent connection is made between the detent protrusion 48 and the detent opening 62 (not visible in FIG. 3), so that a form- and force-locking connection exists between the adapter element 28 and the wiper arm 12.

Figure 4:
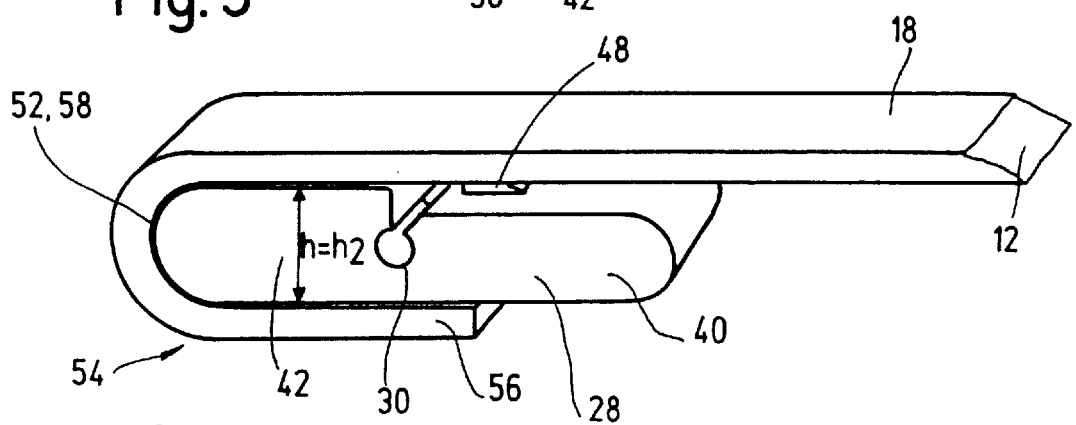

In the variant embodiment shown in FIG. 4, the hook 54 of the wiper arm 12 is embodied such that the height h of the free space 60 is equivalent to the height $h_2$ of the portion 42 of the adapter element 28. In order to achieve a form- and force-locking connection between the wiper arm 12 and the adapter element 28 here as well, the adapter element 28 need merely be rotated 180° about the pivot pin 26, so that the portion of the adapter element 28 engages the free space 60. The force-locking connection is made via a detent connection between the detent protrusion 46 and the detent opening 62. The detent protrusion 48, partly visible in the view of FIG. 4, can additionally act to support the end 18 of the wiper arm 12.

In FIGS. 5 and 6, further variant embodiments are shown, which pertain to different designs of the hook 54 of the wiper arm 12. The portions 58 can for instance have different lengths, so that the portion 40 or the portion 42 of the adapter element 28 either only partly fills up the free space 60, as shown in FIG. 5, or only partly engages the inside of the free space 60, as shown in FIG. 6. The detent openings 62 are embodied to suit the length of the portions 56 of the hooks 54, so that the force-lock between the adapter element 28 and the wiper arm 12 remains assured by the detent connection.

It is readily apparent from the illustrations in FIGS. 2–6 that by means of a single adapter element 28, differently embodied wiper arms 12, and in particular with differently embodied hooks 54, can be connected to the retaining bracket 22.

In FIG. 7, the adapter element 28 is shown in a further exemplary embodiment. Identical elements to those of the preceding drawing figures are again provided with the same reference numerals and are not described again. For the force-locking connection of the adapter element 28 to the wiper arm 12, the adapter element 28 has clamping hooks 70. The clamping hooks 70 extend outward past the end faces 50 and 52 of the adapter element 28 and form bearing faces 70 and 72, respectively, that extend parallel to the end faces 50 and 52 and in particular coaxially to the end faces 50 and 52 that extend at a radius. As a result, a gap 74 is formed between the end face 50 and the bearing face 70, or the end face 52 and the bearing face 72; its curvature corresponds to the curvature of the hook 54 of the wiper arm 12. The wiper arm 12 is thrust with its hook 54 laterally into the gap 74, thereby creating a form and force lock between the adapter element 28 and the wiper arm 12.

What is claimed is:

1. A windshield wiper, comprising a drivably supported wiper arm; a wiper blade carried on a free end of said wiper arm; a retaining bracket detachably and pivotably connecting said wiper blade with said wiper arm; an adapter element connecting said wiper arm and said retaining bracket, said adapter element having a shape which permits a form-and force-locking connection with said wiper arm and said retaining bracket, said adapter element being detachably arrangeable on said wiper arm and said retaining bracket in individual positions in which said adapter element is pivoted by 180° with respect to said wiper arm and having a different shape characteristic permitting adaptation to differently shaped wiper arms, said adapter element having a longitudinal face provided with a shoulder which forms in said adapter element portions with different heights, said portions having end faces extending at a radius, which depending on a height of a free space of said hook forms a form lock with a jacket space of said hook.

2. A windshield wiper as defined in claim 1, wherein said retaining bracket has a pivot pin, said adapter element being rotatably supported on said pivot pin of said retaining bracket.

3. A windshield wiper as defined in claim 2, wherein said adapter element has a through opening which is open in its periphery so that said adapter element can be snapped by said through opening onto said pivot pin in detent fashion.

4. A windshield wiper as defined in claim 1, wherein said wiper arm has a hook which is in a form-locking connection with said adapter element through said portions.

5. A windshield wiper as defined in claim 1, wherein said wiper arm has a detent opening, said adapter element having a plurality of longitudinal faces each provided at least one detent protrusion snappable in detent fashion into said detent opening of said wiper arm, depending on a disposition of said adapter element.

6. A windshield wiper as defined in claim 1, wherein said adapter element has clamping hooks providing said form- and force-locking connection said wiper arm.

7. A windshield wiper as defined in claim 1; and further comprising a detent connection both between said adaptor element and said wiper arm and between said adaptor element and said retaining bracket allowing a detachable and pivotable connection between said wiper arm and said retaining bracket.

* * * * *